April 20, 1954 W. R. BENNETT ET AL 2,676,206

COMPUTATION AND DISPLAY OF CORRELATION

Filed Dec. 6, 1951 2 Sheets-Sheet 1

INVENTORS: W. R. BENNETT
L. C. PETERSON

BY Harry C. Hart

ATTORNEY

INVENTORS: W. R. BENNETT
L. C. PETERSON
BY Harry C. Hart
ATTORNEY

Patented Apr. 20, 1954 2,676,206

UNITED STATES PATENT OFFICE 2,676,206

COMPUTATION AND DISPLAY OF CORRELATION

William R. Bennett, Summit, and Liss C. Peterson, Chatham, N. J., assignors to Bell Telephone Laboratories, Incorporated, New York, N. Y., a corporation of New York Application December 6, 1951, Serial No. 260,172

9 Claims. (Cl. 179—1)

This invention relates to signal analysis and particularly to the analysis of time-varying signals by way of correlation techniques.

It is well known to analyze a signal which is a function of time into its several frequency components, determine the energy in each of these components and display the result as a variation of intensity on a plot whose rectangular coordinates are frequency and time. Such apparatus or "spectrograph," as it has been termed, and the analyses obtained therewith are shown for example in "An 8000 cycle sound spectrograph" by Otto Gruenz, published in the Bell Laboratories Record for June 1951, vol. 29, page 256. While this apparatus requires that a complete record be made of the signal to be analyzed before the analysis is started, means are also known by which analyses of this character may be carried out substantially contemporaneously with the generation or reception of the signal. When the information contained in a signal presents itself naturally as a complex of frequencies or when it is the frequency of its various components which are of principal interest, apparatus such as that described in the aforementioned publication serves the purpose.

There exist, however, signals which naturally appear in the form of a pulse or a sequence of pulses, and there exist circumstances under which the time relations of such phenomena are of much greater interest than their frequencies. In such cases analysis of signals by way of the correlation approach is more expedient than spectrum analysis.

In correlation analysis a signal $f(t)$ to be analyzed is compared, for each of a number of different values of lag $\tau$ by which it is delayed, either with a reference signal or with an undelayed version of the original signal. In particular, the cross correlation $\varphi_{12}$ of two signals $f_1(t)$ and $f_2(t)$, is given, for any particular value of $\tau$, by $$\varphi_{12}(t,\tau)=\frac{1}{T}\int_{t-\frac{T}{2}}^{t+\frac{T}{2}} f_1(t)\cdot f_2(t-\tau)dt \quad (1)$$

Autocorrelation $\varphi_{11}$ is similar, with the sole difference that one signal is a delayed version of the other, thus $$\varphi_{11}(t,\tau)=\frac{1}{T}\int_{t-\frac{T}{2}}^{t+\frac{T}{2}} f(t)\cdot f(t-\tau)dt \quad (2)$$

In these expressions, the integration is taken over a range of the time extending from $$-\frac{T}{2} \text{ to } +\frac{T}{2}$$

the origin of coordinates being taken at the center of the range.

Theoretical aspects of correlation analysis are described for example in "Correlation function analysis" by L. G. Kraft, published in the Journal of the Acoustical Society of America for November 1950, vol. 22, page 762. Rudimentary apparatus for the delayed computation of autocorrelation, based on the preliminary formation of a complete record of the signal, is shown in an article by K. N. Stevens published at page 769 of the same journal.

Accordingly, primary objects of the invention are to perform a correlation analysis on an incoming signal and to perform it substantially instantaneously, i. e., concurrently with the generation or reception of the signal. To this end a running record of the signal to be analyzed is made, for example in the form of a space-variant signal on a magnetizable tape, and thereafter, and for contemporaneous analysis immediately thereafter, a reproducing device scans a small segment of this record to provide a new time-variant signal which is related in known fashion to the original one. This new signal is applied to a delay device having a multiplicity of taps. These taps are connected in succession to one input point of a multiplier, while the undelayed signal is connected to the other input point of the multiplier. Inasmuch as a portion of the scanned segment of the derived signal is at every instant stored in the delay device, and as the derived signal is in the form $f(t)$, then the output derived from each tap of the delay device is of the form $f(t-\tau)$, where $\tau$ has a different value for each tap. Thus the multiplier forms a product $f(t)\cdot(t-\tau)$ for each successive value of lag $\tau$. The product is then integrated over an appropriate time and the result is thus in accordance with Equation 2.

Because the reproducer scans the selected segment of the original record repeatedly, there occur instants in the course of each scan in which the signal resulting from the beginning of one scan is stored at the head end of the delay device while the signal resulting from the concluding part of the prior scan is still stored in the tail end of the delay device. Multiplication of these signals, one by the other, would evidently give an erroneous result. Therefore, in accordance with a further feature of the invention, provision is made to avoid errors of this character by sampling the outputs of the successive delay device taps at those instants, and only at those instants, during which the signal stored in the delay device, is from end to end thereof, due to a single scan of the recorded record segment by the reproducer.

In further accordance with the invention, the quantity so computed or generated is applied to the stylus or other current-sensitive element of a suitable recorder which in itself may be of a construction well known in the art of facsimile transmission and which is adapted to translate the computed quantity into a mark of variable intensity on a suitable medium which is steadily advanced past the recorder in a time coordinate, while a suitable mechanism is employed to move the stylus laterally over a medium in coordination with the changes in lag which are employed as a feature of the analysis. There results a plot of the correlation of the two signals considered, or the autocorrelation of the one signal considered, as the case may be, as a variation of intensity in lag-time coordinates. In other words, there results a three-dimensional intensity-lag-time plot.

The invention will be fully apprehended from the following detailed description of a preferred embodiment thereof, taken in connection with the appended drawings, in which.

Figure 1:
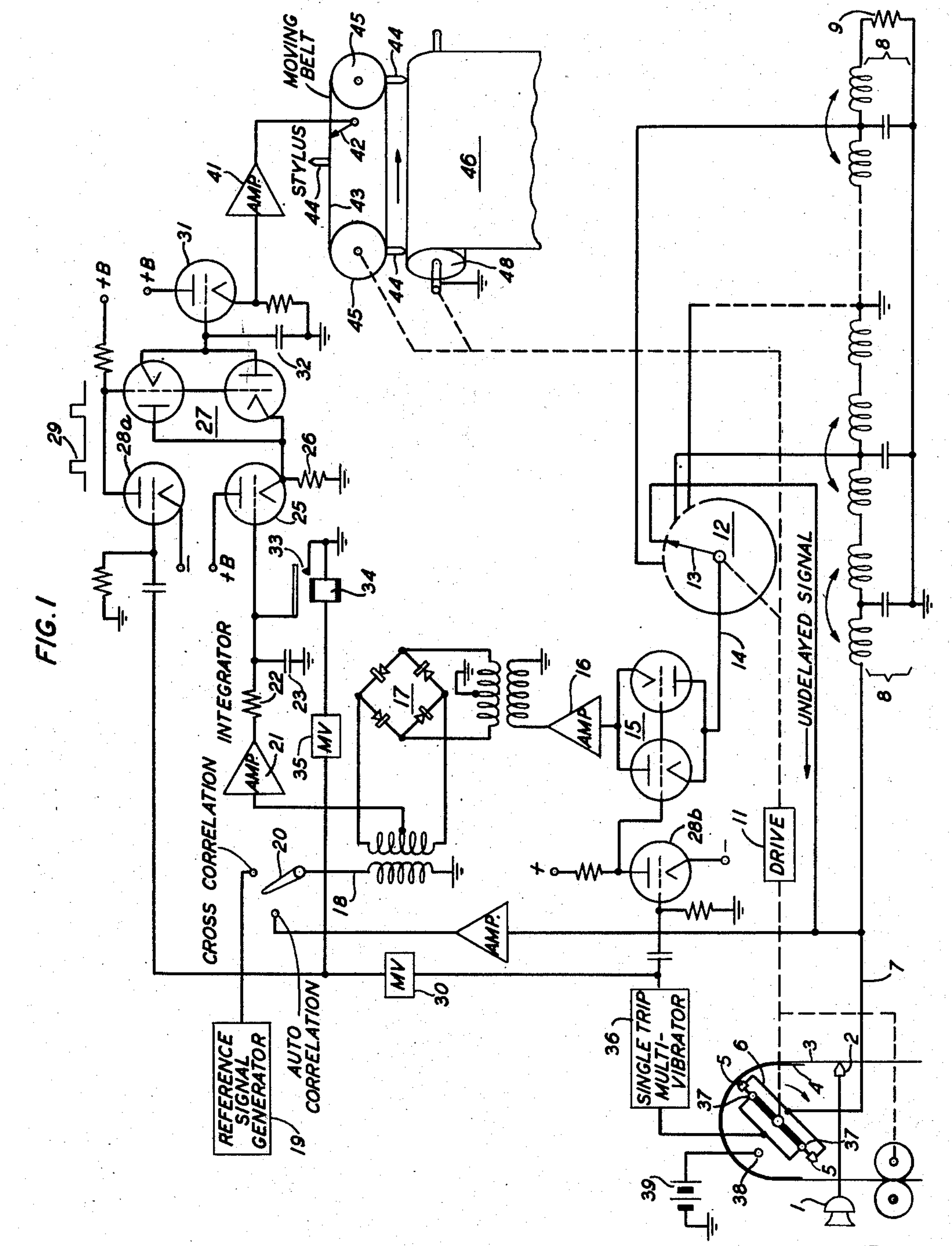
Fig. 1 is a schematic circuit diagram embodying the invention.

In the description which follows, principal emphasis is laid on the determination and display of the autocorrelation function of a single signal because this is the problem of main practical interest. However, by merely throwing a switch, a reference signal is substituted for the undelayed signal, in which case the apparatus computes and displays the cross-correlation function of two signals.

Referring now to the drawings, the signal to be analyzed, and originating for example in a microphone 1 is first translated by a recording device 2 into a space-variant signal onto a lineal record, for example a magnetizable tape 3. A small segment of this tape passes around a semicircular track 4 where it is rapidly and repeatedly scanned, e. g., sixty times per second, by one member or the other of a pair of magnetic reproducers 5, which are connected, in series or in parallel, to a conductor 6. The latter is connected, e. g., by a rotary connector or slip ring, not shown, to an output conductor 7. The time-variant signal which results from this operation is now applied by way of the output conductor 7 to the input end of a delay device such as an electromagnetic delay line 8. The latter may comprise for example, 240 similar sections having 120 evenly spaced taps i. e., one located at every other section. The line 8 may be terminated in well-known fashion for no reflection by a load 9. In terms of propagation time along the delay line 8 the spacing between each tap and the next one may be 20 microseconds; the total delay for all 240 sections being thus 2.4 milliseconds.

Each of these taps is connected to a segment of a commutator 12 whose wiper arm 13 sweeps over them in succession, making a full revolution in 2 seconds, during which period the reproducers 5 have accomplished 120 scans, one for each tap of the delay line 8. A common drive 11 assures the required synchronism. A conductor 14 connected to the wiper arm 13 thus carries a sequence of samples of the signal each of which lags the other by 20 microseconds. These samples are passed by way of a double-triode gate 15 and an amplifier 16 to one input point of a multiplier for example across the horizontal diagonal of a bridge multiplier 17 whose midpoint is effectively grounded. At the same time a reference signal is applied by way of a conductor 18 to the other input point of this multiplier 17, for example, the terminals of its vertical diagonal. In the case of autocorrelation analysis, this reference signal may be the output of the reproducers 5 as it appears on the conductor 7. In the case of cross-correlation analysis, the reference signal may be derived from an independent reference signal source 19. A manual switch 20 is provided for the shift. As is well known, the output which appears between the midpoint of the vertical diagonal of such a bridge multiplier 17 and ground is proportional to the product of the two input signals. After level adjustment, if desired, by an amplifier 21, this product is now integrated over a period equal to and coincident with the interval during which the wiper arm 13 is in electrical contact with one segment of the commutator 12. The combination of a resistor 22 and a condenser 23, whose time constant is about ten times this interval, or 140 milliseconds in the illustrative embodiment, serves the purpose. The integral thus formed is now applied to the grid of a cathode follower tube 25 whose cathode load impedance 26 is connected to a double triode gate 27 whose grids are supplied by way of a buffer 28a with gating pulses 29 derived from a timing pulse source such as a multivibrator 30. Each of these gating pulses establishes a low resistance path from the cathode follower tube 25 to a power amplifier 31 when and only when a gating pulse appears, thus applying to a condenser 32 a charge proportional to the charge appearing on the integrating condenser 23 at the end of each contact interval of the wiper 13 with a commutator bar. For this purpose the multivibrator or other timing pulse source must evidently be synchronized and phased with the movement of the commutator wiper arm.

The integrating condenser 23, for correct operation, should be discharged at the conclusion of each of its operations and for this purpose it is connected by way of a relay contact 33 to ground each time a gating pulse is applied to the relay winding 34. Such gating pulses may be derived from the sample-gating multivibrator 30 and slightly delayed by an auxiliary multivibrator 35 with respect to the sample gating pulses.

Figure 2:
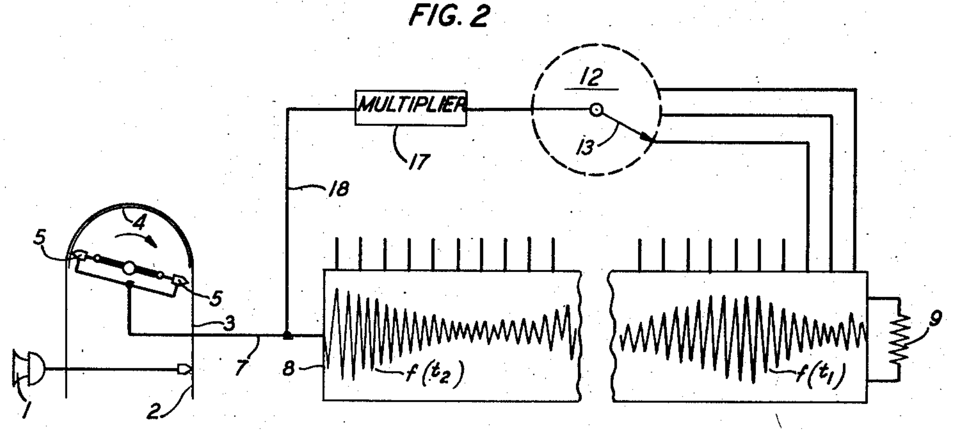
Fig. 2 is an explanatory diagram illustrating the need for a certain feature of the invention.

Coming now to the feature by which incorrect multiplications are avoided, Fig. 2, from which many circuit elements not germane to the particular problem have been omitted, shows the situation which holds when one reproducer head 5 has just concluded its scan of the record segment supported by the track 4 and the other has just entered upon the recorded segment and has commenced the next scan. The signal most recently picked up by the right-hand reproducer head, which originated at an earlier time $t_1$, is stored in the tail end of the delay line 8 as $f(t_1)$, while the signal being picked up by the left-hand reproducer head, which originated at a later time $t_2$, is being stored in the head end of the delay line as $f(t_2)$. If, under such conditions, the output of one of the far end taps of the delay line 8 were to be multiplied by the undelayed signal the result would be the improper product $$f(t_2)\cdot f(t_1-\tau)$$

Ideally this situation can be avoided by adjusting the length of each of the segments of the commutator 12 in such fashion that the duration of contact between the wiper arm 13 and any one segment coincides exactly with the time interval in which the delay line 8 is completely filled by the output of a single sweep of one of the reproducer heads 5 across the recorded signal segment. In the illustrative embodiment shown, an interval of 2.4 milliseconds, equal to the total delay of the whole delay line 8, elapses between the beginning of a sweep of one reproducer head 5 and the time at which all of the energy stored in the delay line 8 from the previous sweep of the other reproducer head 5 has been completely dissipated in the terminating impedance 9 at the far end of the line. By correct adjustment of the length of each commutator segment and of the space between adjacent segments the wiper arm 13 is held out of electrical contact with any conducting segment of the commutator during this 2.4 millisecond interval. Following each such blank interval the wiper arm 13 then makes electrical contact with a conducting segment throughout the remaining 14.3 milliseconds of the wiper cycle, the sum of these two intervals being 2.4 ms.+14.3 ms.=16.7 ms.=1/60 second Such a construction of the commutator segment places exceedingly severe demands on the precision with which it is fabricated and, therefore, in accordance with a further feature of the invention, illustrated in Fig. 1, the stringency of these requirements is relieved by the interposition of a gate, e. g., the triode gate 15, between the output conductor 14 of the commutator wiper arm 13 and the multiplier 17. By way of a buffer 28b this triode gate is actuated sixty times per second and for a period of 14.3 milliseconds on each occasion by the output of a single trip multivibrator 36 which is tripped by a pulse derived, for example, from the passage of either of two supplementary contacts 37 mounted on the arm which carries the reproducer heads 5 with a fixed contact 38 which is connected by way of a battery 39 to ground. The output of the same multivibrator 36 may conveniently be employed to trip the multivibrator 30 which in turn trips the multivibrator 35.

The output of the power amplifier 31 is now applied by way of a marking amplifier 41 and a wiping contact 42 to the sensitive element of a recorder whose construction may be similar to the recorders customarily employed in the art of facsimile transmission. One suitable recorder comprises an endless belt 43 of conducting material bearing three styli 44. It is advanced by pulleys 45 driven by the common drive 11 in such fashion that each stylus 44 moves from one margin of a strip of sensitive paper 46, such as Western Union "Teledeltos" paper, to the other margin in the same time, e. g., two seconds, as is occupied by the commutator wiper 13 in accomplishing one full commutator revolution and by the reproducer heads 5 in making a number of scans of the record segment equal to the number of segments of the commutator 12. As each one of the styli 44 leaves the paper strip 46, another one enters upon it. Meanwhile the record tape 3 is continuously advanced by the drive 11 past the reproducers 5, and the paper 46 is continuously led by the drive 11 past the styli 44 and over a roller 48 which may be grounded.

Figure 3:
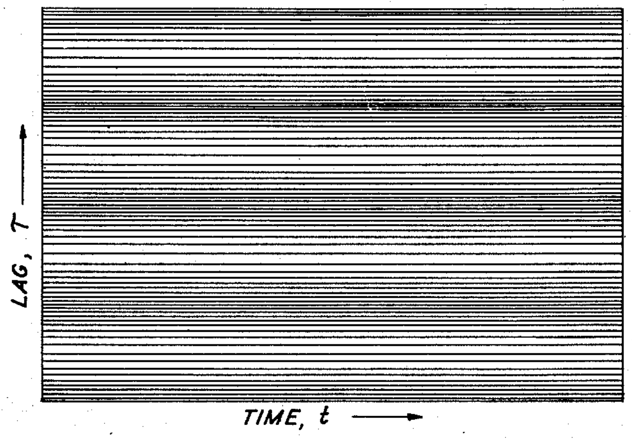
Fig. 3 is a representation of the autocorrelation function of a sine wave as computed and plotted by the apparatus of Fig. 1.

As a result the current entering the conductive belt 43 from the power amplifier 31 traverses the paper 46 to the roller 48 in the form of a spark discharge whose intensity is substantially proportional to that of the output of the amplifier 31, independent of its sign; i. e., the signal is rectified in recording. This process forms a mark on the paper 46 whose density is related to the quantity computed by the analyzing apparatus, namely the cross-correlation between the recorded signal and the reference signal, or the autocorrelation of the recorded signal. Each such mark appears at a part of the paper whose lateral coordinate is proportional to lag, and whose lengthwise coordinate is proportional to time. Thus a three-dimensional intensity-lag-time pattern is continuously built up. Fig. 3 indicates the appearance of such a pattern for a sine wave, the lag $\tau$ extending over four wavelengths.

What is claimed is:

1. Apparatus for computing the autocorrelation function of a signal $f(t)$ and for displaying the same, concurrently with the generation of said signal, as a function of time and of lag which comprises means for delaying said signal by a controllably variable amount $\tau$, to form a lagged signal $f(t-\tau)$, means for multiplying the lagged signal $f(t)$ by the original signal to form a product, means for integrating said product over a time of interest to form an integral, means for successively increasing the lag $\tau$ to each of a succession of different values, means for repeating said operations of multiplication and integration for each such value of $\tau$, an impression-sensitive medium, means for continuously advancing said medium in proportion to time in a longitudinal direction, a recording element, means for moving said element across said medium once for each full passage of the lag $\tau$ through all of its values, and means for applying said integral to said element to form impressions thereon of density related to the autocorrelation function of said original signal and at points of said medium related to time and to lag.

2. Apparatus for computing the correlation function of two signals $f_1(t)$ and $f_2(t)$ and for displaying the same, concurrently with the generation of said signals, as a function of time and of lag which comprises means for delaying said second signal by a controllably variable amount $\tau$, to form a lagged signal $f_2(t-\tau)$, means for multiplying the lagged second signal by the first signal $f_1(t)$ to form a product, means for integrating said product over a time of interest to form an integral, means for successively increasing the lag $\tau$ to each of a succession of different values, means for repeating said operations of multiplication and integration for each such value of $\tau$, an impression-sensitive medium, means for continuously advancing said medium in proportion to time in a longitudinal direction, a recording element, means for moving said element across said medium once for each full passage of the lag $\tau$ through all of its values, and means for applying said integral to said element to form impressions thereon of density related to the correlation function of said original signals and at points of said medium related to time and to lag.

3. Apparatus for computing the correlation function of two signals $f_1(t)$ and $f_2(t)$ and for displaying the same, concurrently with the generation of said signal, as a function of time and of lag which comprises means for generating successive values of a lag $\tau$, means for generating the product of $f_1(t)\cdot f_2(t-\tau)$ for each such value of $\tau$, means for integrating each of said products over a time of interest to form a derived signal, an impression-sensitive medium, means for regularly advancing said medium in proportion to time in a longitudinal direction, a recording element, means for moving said element across said medium once for each full passage of the lag $\tau$ through all of its values, and means for applying said derived signal to said element to form impressions thereon of density related to the correlation function of said original signals and at points of said medium related to time and to lag.

4. Apparatus for computing the autocorrelation of a signal $f(t)$ and for displaying the same, concurrently with the generation of said signal, as a function of time and of lag which comprises means for generating successive values of a lag $\tau$, means for generating a product $f(t)\cdot f(t-\tau)$ for each such value of $\tau$, means for integrating each of said products over a time of interest to form a derived signal, an impression-sensitive medium, means for regularly advancing said medium in proportion to time in a longitudinal direction, a recording element, means for moving said element across said medium once for each full passage of the lag $\tau$ through all of its values, and means for applying said derived signal to said element to form impressions thereon of density related to the autocorrelation function of said original signal and at points of said medium related to time and to lag.

5. Apparatus for computing the autocorrelation function of a signal and for displaying the same as a function of time and of lag which comprises means for first forming a space-variant record counterpart of said signal at a first speed, means for repeatedly scanning a short segment of said space-variant record at a higher speed to provide a time-variant signal whose frequencies are increased as compared with the frequencies of the original signal in the ratio of the scanning speed to the recording speed, a multiplier having two input points and an output point, one input point being connected directly to said scanning means, variable time delay means comprising a delay device having an input point and a plurality of taps, said last-named input point being connected directly to said scanning means, means for establishing a connection from one of said taps to the second input point of said multiplier during each passage of said scanning means over said record segment, means for regularly advancing the tap from which said connection is established, one tap for each passage of said scanning means over said record segment, whereby said scanning means is connected to the first of said multiplier input points by way of a path of invariant length and to the second of said multiplier input points by a path including a length of said delay device from the input point thereof to the tap to which connection is currently made, means for integrating the multiplier output over the period of each passage of said scanning means over said record segment, means for regularly sampling the output of said multiplier once for each passage of said scanning means over said record segment, an impression receiving medium having a length dimension and a width dimension, means for continuously advancing said medium in its length dimension in proportion to time, a stylus movable in the width dimension of said medium, means for cyclically moving said stylus across said medium from side to side thereof in its width dimension once for each full cycle of establishment of connections to the several taps of said delay device, and means for applying the output of said sampling device to said stylus, whereby an impression is formed on said medium whose intensity is proportional to the magnitude of the autocorrelation function of said signal and whose location on said medium is proportional to the time at which, and to the self-displacement for which, said magnitude exists.

6. Apparatus as defined in claim 5 wherein the means for establishing a connection to the second input point of the multiplier from a tap of the delay device comprises a gate, and means for energizing said gate to establish said connection only during periods when the signal stored in said delay device is derived from a single scan of said space-variant record by said scanning means.

7. In combination with two signal sources, apparatus for computing the correlation function of two signals and for displaying the same as a function of time and of lag which comprises a multiplier having two input points and an output point, one input point being connected directly to the source of one of said signals, variable time delay means comprising a delay device having an input point and a plurality of taps, said last-named input point being connected directly to the source of the other of said signals, means for establishing a connection from one of said taps to the second input point of said multiplier, means for regularly advancing the tap from which said connection is established, whereby the source of the one signal is connected to the first of said multiplier input points by way of a path of invariant length and the source of the other signal is connected to the second of said multiplier input points by a path including a length of said delay device from the input point thereof to the tap to which connection is currently made, means for integrating the multiplier output over a period of interest to form an integral, and means for displaying each successive value of said integral as intensity in a field whose coordinates are proportional to the time at which and to the delay device tap for which, said integral is formed.

8. In combination with a signal source, apparatus for computing the autocorrelation function of a signal of said source and for displaying the same as a function of time and of lag which comprises means for first breaking said signal into a plurality of successive short segments, a multiplier having two input points and an output point, means for applying said short signal segments to one of said input points, variable time delay means comprising a delay device having an input point and a plurality of taps, means for applying said short signal segments to said last-named input point, means for successively establishing connections from all of said taps to the second input point of said multiplier during each of said successive signal segments, whereby said signal segments are applied to the first of said multiplier input points by way of a path of invariant length and to the second of said multiplier input points by a path including a length of said delay device from the input point thereof to the tap to which connection is currently made, means for integrating the multiplier output over the period of each signal segment to form an integral, and means for displaying each successive value of said integral as intensity in a field whose coordinates are proportional to the times at which, and to the delay device for which, said integral is formed.

9. In combination with a signal source, apparatus for computing the autocorrelation function of a signal of said source and for displaying the same as a function of time and of lag which comprises means for first breaking said signal into a plurality of successive short segments, a multiplier having two input points and an output point, one input point being connected directly to said source, variable time delay means comprising a delay device having an input point and a plurality of taps, said last-named input point being connected directly to said source, means for successively establishing connections from all of said taps to the second input point of said multiplier during each of said successive signal segments, whereby said source is connected to the first of said multiplier input points by way of a path of invariant length and to the second of said multiplier input points by a path including a length of said delay device from the input point thereof to the tap to which connection is currently made, means for integrating the multiplier output over the period of each signal segment, an impression receiving medium having a length dimension and a width dimension, means for continuously advancing said medium in its length dimension in proportion to time, a stylus movable in the width dimension of said medium, means for cyclically moving said stylus across said medium from side to side thereof in its width dimension once for each full cycle of establishment of connections to the several taps of said delay device, and means for applying the output of said integrating means to said stylus, whereby an impression is formed on said medium whose intensity is proportional to the magnitude of the autocorrelation function of said signal and whose location on said medium is proportional to the time at which, and to the lag for which, said magnitude exists.

References Cited in the file of this patent

UNITED STATES PATENTS

| Number | Name | Date |
| --- | --- | --- |
| 2,181,265 | Dudley | Nov. 28, 1939 |
| 2,403,984 | Koenign, Jr., et al. | July 16, 1946 |